US008845256B2

(12) United States Patent
Gaw

(10) Patent No.: US 8,845,256 B2
(45) Date of Patent: Sep. 30, 2014

(54) FASTENER AND FASTENER ASSEMBLY WITH DISCONTINUOUS THREADFORM

(71) Applicant: The Boeing Company, Chicago, IL (US)

(72) Inventor: Kevin O. Gaw, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/735,032

(22) Filed: Jan. 7, 2013

(65) Prior Publication Data
US 2013/0121787 A1 May 16, 2013

Related U.S. Application Data

(62) Division of application No. 12/727,216, filed on Mar. 18, 2010, now Pat. No. 8,348,576.

(51) Int. Cl.
*F16B 33/02* (2006.01)
*F16B 39/30* (2006.01)
*F16B 33/00* (2006.01)

(52) U.S. Cl.
CPC ............ *F16B 33/02* (2013.01); *F16B 39/30* (2013.01); *F16B 33/006* (2013.01); *Y10S 411/908* (2013.01)
USPC ............ 411/417; 411/309; 411/413; 411/908

(58) Field of Classification Search
USPC ............. 411/417, 437, 411–413, 361.1, 900, 411/903, 907, 305, 306, 308–310
See application file for complete search history.

(56) References Cited

U.S. PATENT DOCUMENTS

| | | | |
|---|---|---|---|
| 351,151 A | 10/1886 | Beachman | |
| 372,479 A | 11/1887 | McKee | |
| 1,203,546 A | 10/1916 | Parsons | |
| 2,445,602 A | 7/1948 | Casaroll | |
| 2,799,587 A | 7/1957 | Schwartz | |
| 2,828,662 A | 4/1958 | Antal | |
| 2,882,781 A | 4/1959 | Gates | |
| 2,935,552 A | 5/1960 | Forman | |
| 3,435,978 A | 4/1969 | Wittwer | |
| 3,661,046 A * | 5/1972 | Waud et al. | 411/369 |
| 3,661,291 A | 5/1972 | Hetzer | |
| 3,701,372 A * | 10/1972 | Breed | 411/309 |
| 3,727,948 A | 4/1973 | Current | |
| 4,177,524 A | 12/1979 | Grell et al. | |
| 4,479,748 A | 10/1984 | Uhlmann | |
| 4,619,569 A | 10/1986 | Wright | |
| 4,637,767 A | 1/1987 | Yaotani et al. | |
| 4,773,858 A | 9/1988 | Marquez | |
| 5,094,618 A | 3/1992 | Sullivan | |
| 5,609,263 A | 3/1997 | Perchepied | |
| 5,667,870 A | 9/1997 | McCullough | |
| 5,913,437 A | 6/1999 | Ma | |
| 6,015,054 A | 1/2000 | King et al. | |
| 6,398,786 B1 * | 6/2002 | Sesic | 606/308 |
| 7,798,755 B2 * | 9/2010 | Tomm | 411/310 |
| 2002/0148800 A1 | 10/2002 | Ozawa et al. | |
| 2009/0110901 A1 | 4/2009 | Gaw et al. | |

* cited by examiner

*Primary Examiner* — Flemming Saether

(57) ABSTRACT

The disclosure provides in one embodiment for a fastener comprising a cylindrical shaft, a head attached to the shaft, and two or more external longitudinal threadforms, where each threadform comprises a plurality of spaced protrusions forming a separate sinusoidal path around the shaft. When the shaft is inserted into a corresponding mating receptacle, a combination of the shaft and the mating receptacle provides two or more pitches. The disclosure further provides for a fastener assembly.

11 Claims, 9 Drawing Sheets

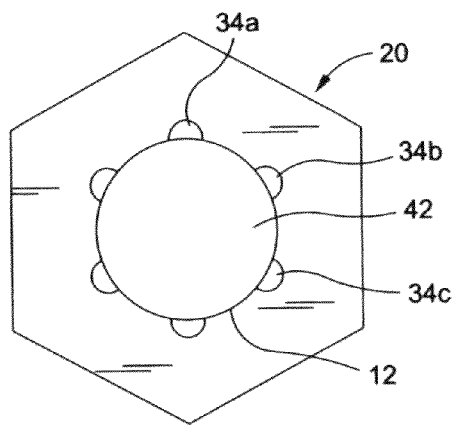
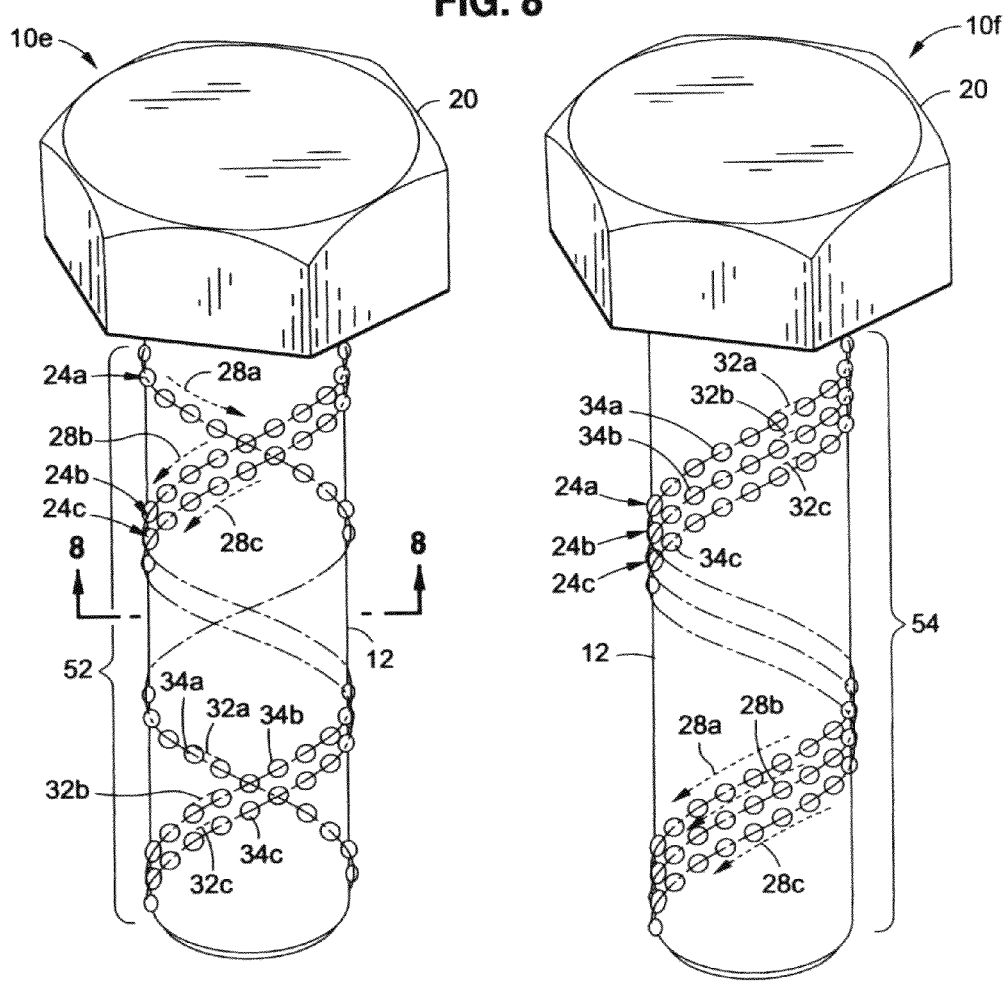
FIG. 8
FIG. 6
FIG. 7

FASTENER AND FASTENER ASSEMBLY WITH DISCONTINUOUS THREADFORM

CROSS-REFERENCE TO RELATED APPLICATIONS

The present application is a divisional of and claims priority to pending application Ser. No. 12/727,216, filed Mar. 18, 2010, and entitled FASTENER AND FASTENER ASSEMBLY WITH DISCONTINUOUS THREADFORM, the entire contents of which is incorporated herein by reference.

BACKGROUND

1) Field of the Disclosure

The disclosure relates generally to threaded fasteners and fastener assemblies, and more particularly, to threaded fasteners and fastener assemblies with discontinuous threadforms.

2) Description of Related Art

Known threaded fastener assemblies comprising threaded fasteners in the form of bolts or screws, and corresponding threaded nuts, are used in numerous applications in the aerospace, military, automotive, construction, and other industries, to fasten component parts together and to fasten other components. Such known threaded fastener assemblies typically have threadforms with a helical, continuous, notch running the length of the threaded portion of either the male fastener or bolt portion or the female nut portion. Known threaded fastener assemblies depend upon a continuous raised threaded portion of the shaft of the male fastener to be in intimate contact with the leading surface and the trailing surface of the internal threads of the female nut. Notch sensitive materials may not be considered as candidate materials for forming known threaded fastener assemblies or fasteners, due to the design of the thread leading to sharp transitions in geometry (angles) and non-blended surfaces leading to sharp notches being formed (e.g., a 45 degree notch) at the base of the fastener thread. Notch sensitivity, understood by one skilled in the art, means a measure of the reduction in strength of a material caused by the presence of a notch or cut. Some materials are more notch sensitive than others. Low notch sensitivity is typically found with ductile materials and high notch sensitivity is typically found with brittle materials. Notch sensitivity of various plastics also differs, for example, nylon and unplasticized polyvinyl chloride (UPVC) are more notch sensitive than high impact polystyrene (HIPS).

Thus, known threaded fastener assemblies and fasteners can be limited in the materials that may be used to make them. Moreover, known threaded fastener assemblies and fasteners have continuous threads that require added material and thus can result in increased weight.

Accordingly, there is a need in the art for an improved threaded fastener and fastener assembly that provides advantages over known threaded fasteners and fastener assemblies.

SUMMARY

This need for an improved threaded fastener and fastener assembly is satisfied. Unlike known threaded fasteners and fastener assemblies, embodiments of the fastener and fastener assembly provide numerous advantages discussed in further detail in the below detailed description.

In an embodiment of the disclosure, there is provided a fastener comprising a cylindrical shaft, a head attached to the shaft, and two or more external longitudinal threadforms, where each threadform comprises a plurality of spaced protrusions forming a separate helical path around the shaft. When the shaft is inserted into a corresponding mating receptacle, a combination of the shaft and the mating receptacle provides two or more pitches.

In another embodiment of the disclosure, there is provided a fastener comprising a cylindrical shaft and a head attached to the shaft. The fastener further comprises a first discontinuous longitudinal threadform comprising a plurality of first spaced protrusions forming a first helical path around the shaft, where the first helical path has a first pitch. The fastener further comprises a second discontinuous longitudinal threadform comprising a plurality of second spaced protrusions forming a second helical path around the shaft, where the second helical path has a second pitch. The first spaced protrusions and the second spaced protrusions comprise a thermoplastic material or a thermoset material. When the shaft is inserted into a corresponding mating receptacle, a combination of the shaft and the mating receptacle provides a first pitch and a second pitch different from the first pitch.

In another embodiment of the disclosure, there is provided a fastener assembly. The fastener assembly comprises a cylindrical shaft and a head attached to the shaft. The fastener assembly further comprises two or more longitudinal threadforms where each threadform comprises a plurality of spaced protrusions forming a separate helical path around the shaft. The fastener assembly further comprises a corresponding mating receptacle designed to compatibly mate with the shaft. When the shaft is inserted into the mating receptacle, a combination of the shaft and the mating receptacle provides two or more pitches.

In another embodiment of the disclosure, there is provided a fastener assembly. The fastener assembly comprises a cylindrical shaft and a head attached to the shaft. The fastener assembly further comprises two or more external longitudinal threadforms on the shaft, each threadform forming a separate helical path around the shaft. The fastener assembly further comprises a corresponding mating receptacle that is designed to compatibly mate with the shaft. The mating receptacle has two or more internal threadforms, where each threadform comprises a plurality of spaced protrusions forming a separate helical path. When the shaft is inserted into the mating receptacle, a combination of the shaft and the mating receptacle provides two or more pitches.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 6 is an illustration of a front perspective view of yet another embodiment of the fastener in the disclosure;

FIG. 7 is an illustration of a front perspective view of yet another embodiment of the fastener of the disclosure;

FIG. 8 is a cross-sectional view of the fastener of FIG. 6 taken along lines 8-8 of FIG. 6;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for a fastener without a continuous threadform that may be comprised in whole, or in part, of potentially notch sensitive materials, as discussed in further detail below. The disclosure further provides for a fastener assembly comprising the fastener without a continuous threadform and a mating receptacle, as discussed in further detail below. The fastener and fastener assembly may be used in numerous applications, such as fastening composite parts for aircraft, spacecraft, watercraft, rotorcraft, and other craft, vehicles, buildings, structural components, and other suitable applications requiring fasteners or fastener assemblies.

Figure 1A:
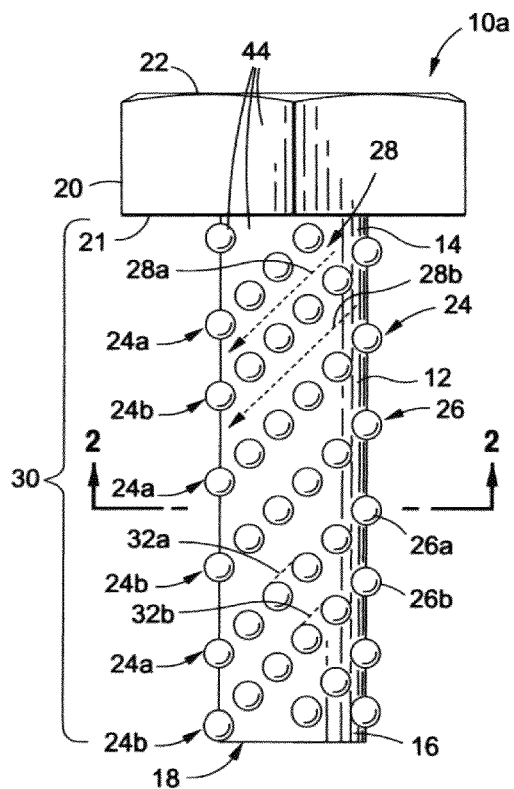
FIG. 1A is an illustration of a front elevation view of one of the embodiments of a fastener of the disclosure where the fastener is made of one material.

Referring to the Figures, FIG. 1A is an illustration of a front elevation view of one of the exemplary embodiments of a fastener 10a of the disclosure. The fastener 10a comprises an elongated, cylindrical shaft 12 or male portion. The shaft 12 has a first end 14 and a second end 16. The shaft 12 preferably has a solid interior 18 (see FIG. 2). However, the shaft 12 may also have a hollow or partially hollow interior (not shown). The fastener 10a further comprises a head 20 attached to the first end 14 of the shaft 12. The head 20 may be separately attached to the first end 14 of the shaft 12, or the head 20 maybe be integrally formed or molded with the shaft 12 when constructed. The head 20 has a first end 21 and a second end 22. The head 20 may have a hexagonal shape 23 (see FIG. 2). The head 20 may also be formed in other known suitable shapes (not shown), such as round or domed, square, button, flat, oval, pan (slightly rounded with vertical sides), truss (extra wide head with a rounded top), or another suitable shape.

Figure 15:
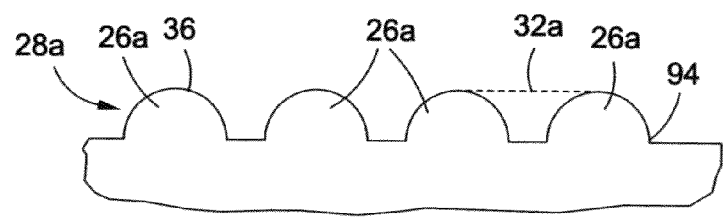
FIG. 15 is an illustration of a close-up side view of some spaced protrusions of FIG. 1A.

The fastener 10a further comprises two or more external, discontinuous, longitudinal threadforms 24. Each threadform 24 preferably comprises a plurality of spaced protrusions 26 that are raised above the external surface of the shaft 12. The spaced protrusions 26 may preferably form two or more separate helical paths 28 that wind around the shaft 12 and form a helical configuration 30. Preferably, the threadforms 24 comprising the spaced protrusions 26 have no sharp edges. Preferably, the fastener 10a comprises a first discontinuous longitudinal threadform 24a having a plurality of first spaced protrusions 26a forming a first helical path 28a around the shaft 12, where the first helical path 28a has a first pitch 32a. Preferably, the fastener 10a further comprises a second discontinuous longitudinal threadform 24b comprising a plurality of second spaced protrusions 26b forming a second helical path 28b around the shaft 12, where the second helical path 28b has a second pitch 32b. Damage tolerance and vibration loosening resistance can be enhanced by the geometry of the threadforms 24 disclosed herein. Each helical path 28a, 28b has a respective pitch 32a, 32b. For purposes of this application, "pitch" means the distance from the crest or top of one helical path 28 formed by the spaced protrusions or "threads" to the crest or top of the adjacent or next helical path 28 formed by the spaced protrusions or "threads". As shown in FIG. 15, which is an illustration of a close-up side view of some of the first spaced protrusions 26a of helical path 28a of FIG. 1A, pitch 32a is the distance between each of two crests or tops of the first spaced protrusions 26a of helical path 28a. Similarly, helical path 28b has a pitch 32b. For the embodiments of the threadforms with spaced protrusions as disclosed herein, the pitch of each helical path may be of the same or different rotation, e.g., both counterclockwise, both clockwise, or one helical path being counterclockwise and one helical path being clockwise. For purposes of this application, "lead" means the distance along the fastener's longitudinal axis that is covered by one complete rotation of the fastener (360 degrees). For purposes of this application "single-start threadforms" are threadforms that have only a single thread wrapped around the circumference of the shaft. Each time the fastener shaft rotates one turn (360 degrees), it advances axially by the width of one thread. Single-start threadforms have the same pitch and lead. For purposes of this application, "double-start threadforms" are threadforms that have two threads wrapped around the circumference of the shaft. Each time the fastener shaft rotates one turn (360 degrees), it advances axially by the width of two threads. With double-start threadforms, the lead is twice the pitch.

Figure 9:
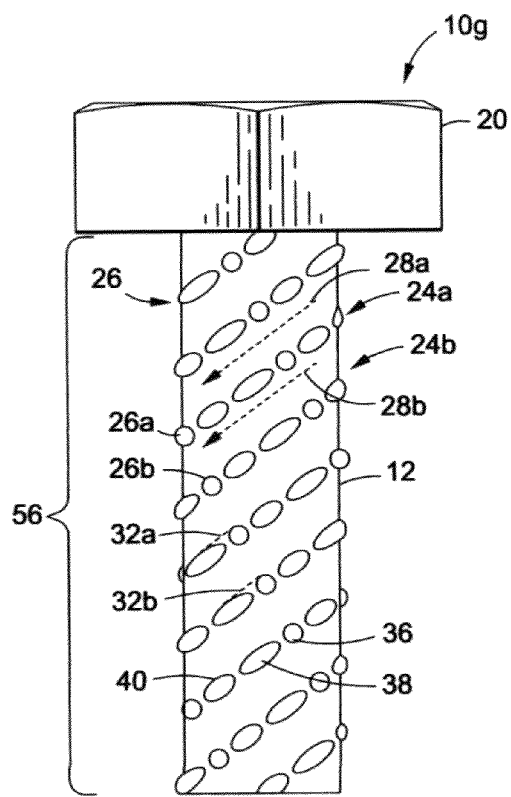
FIG. 9 is a front elevation view of yet another embodiment of the fastener of the disclosure.
Figure 16:
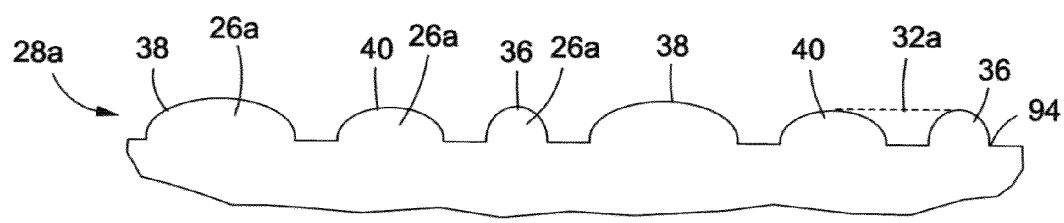
FIG. 16 is an illustration of a close-up side view of some spaced protrusions of FIG. 9.

Preferably, the spaced protrusions 26 comprise discontinuous threadforms that run the length of the shaft 12. Preferably, the spaced protrusions 26 are in the form of bumps 34 (see FIG. 1A). The spaced protrusions 26 may be formed in one or more raised shapes comprising angular, hemispherical, pyramidal, or curvilinear solid shapes such as curved, elliptical, or toroid, or another suitable shape. In one embodiment of the fastener 10a, as shown in FIG. 1A, the spaced protrusions 26 may all be of the same uniform shape, size, and height. As shown in FIG. 15, the spaced protrusions 26a may be of a round or curved shape 36. In another embodiment of the fastener 10g as shown in FIG. 9, the spaced protrusions 26 may be of two or more different or varying shapes, sizes, and heights. In FIG. 9, the threadforms 24 may be comprised of spaced protrusions 26 of a round or curved shape 36, spaced protrusions 26 of a first elliptical shape 38, and spaced protrusions 26 of a second elliptical shape 40, where the first elliptical shape 38 may be larger than the second elliptical shape 40. FIG. 16 is an illustration of a close-up side view of some of the first spaced protrusions 26a of FIG. 9 having varying shapes and showing the round or curved shape 36, the first elliptical shape 38, and the second elliptical shape 40.

Figure 2:
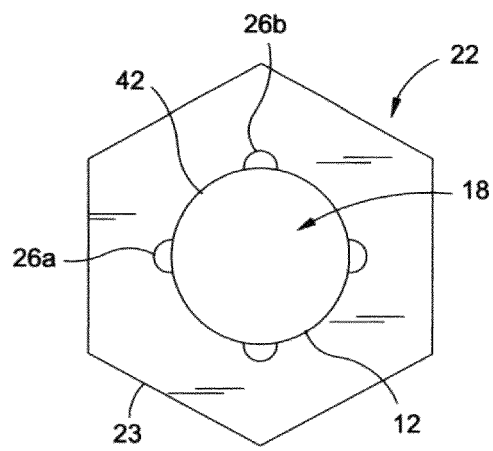
FIG. 2 is an illustration of cross-sectional view of the fastener of FIG. 1A taken along lines 2-2 of FIG. 1A.

FIG. 2 is an illustration of a cross-sectional view of the fastener 10a of FIG. 1A taken along lines 2-2 of FIG. 1A and showing the hexagonal shape 23 of the head 20. As shown in FIG. 2, the cross-section of fastener 10a of FIG. 1A shows head 20, first spaced protrusions 26a, second spaced protrusions 26b, and a bottom 42 of the shaft 12 showing the interior 18 of the shaft as solid.

Figure 1B:
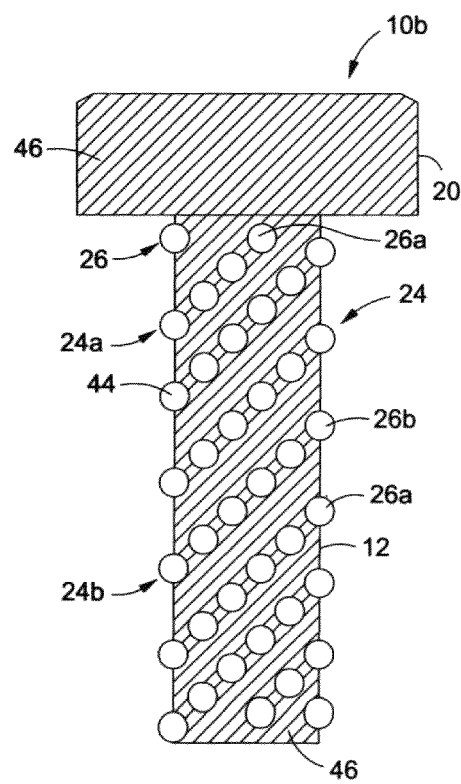
FIG. 1B is an illustration of a front elevation view of another embodiment of a fastener of the disclosure where the fastener is made of two materials.

In one embodiment of the fastener 10a, as shown in FIG. 1A, the shaft 12, the head 20, and the spaced protrusions 26 may all be formed or constructed of a first material 44. Preferably, the first material 44 is a notch sensitive material. The notch sensitive material may comprise thermoplastic materials, thermoset materials, polyetherimide, polycarbonate, acrylates, epoxies, metals, or another suitable notch sensitive material. The spaced protrusions 26 comprising a material, such as a thermoplastic or a thermoset material, preferably allow for deformation of the spaced protrusions 26 to enhance the anti-vibrational nature of the threadforms. In another embodiment of the fastener 10b, as shown in FIG. 1B, only the spaced protrusions 26 may be comprised of the first material 44, and the shaft 12 and the head 20 may be comprised of a second material 46 which is different from the first material 44.

Figure 5:
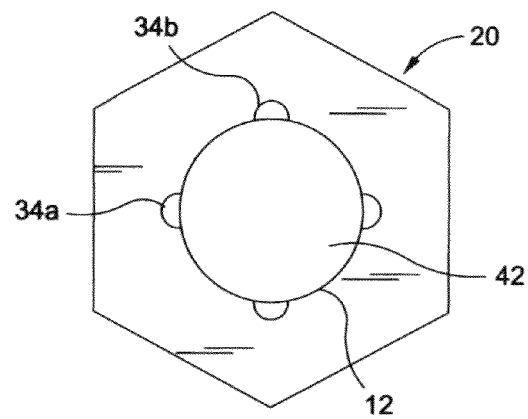
FIG. 5 is a cross-sectional view of the fastener of FIG. 3 taken along lines 5-5 of FIG. 3.
Figure 3:
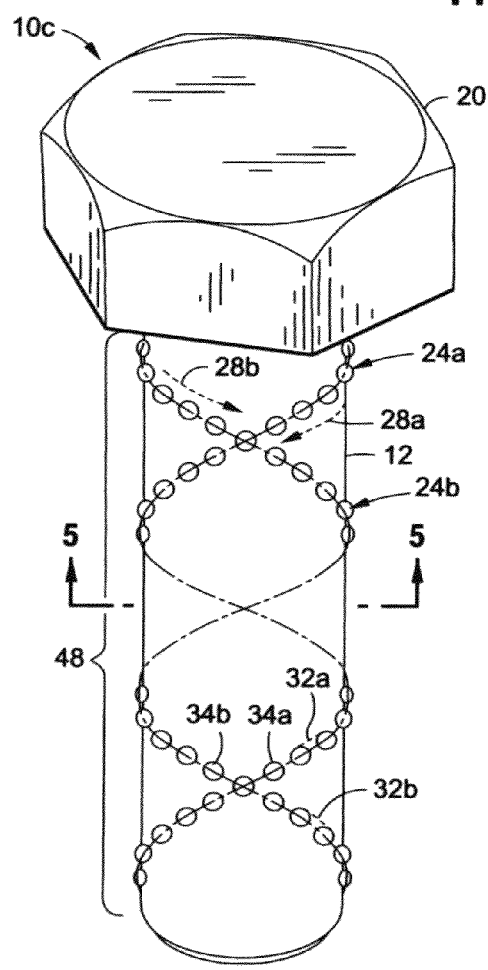
FIG. 3 is an illustration of a front perspective view of another embodiment of a fastener of the disclosure.

FIG. 3 is an illustration of a front perspective view of another embodiment of the fastener 10c of the disclosure. In this embodiment the fastener 10c comprises a double helical configuration 48. The fastener 10c comprises elongated, cylindrical shaft 12 or male portion and head 20 attached to the shaft 12. The fastener 10c further comprises first discontinuous longitudinal threadform 24a having a plurality of first spaced protrusions in the form of bumps 34a forming a first helical path 28a around the shaft 12, where the first helical path 28a has a first pitch 32a. The fastener 10c further comprises a second discontinuous longitudinal threadform 24b comprising a plurality of second spaced protrusions in the form of bumps 34b forming a second helical path 28b around the shaft 12, where the second helical path 28b has a second pitch 32b. The first spaced bumps 34a and the second spaced bumps 34b preferably comprise two helices. FIG. 5 is a cross-sectional view of the fastener 10c of FIG. 3 taken along lines 5-5 of FIG. 3. As shown in FIG. 5, the cross-section of fastener 10c of FIG. 3 shows head 20, first spaced bumps 34a, second spaced bumps 34b, and the bottom 42 of the shaft 12.

Figure 4:
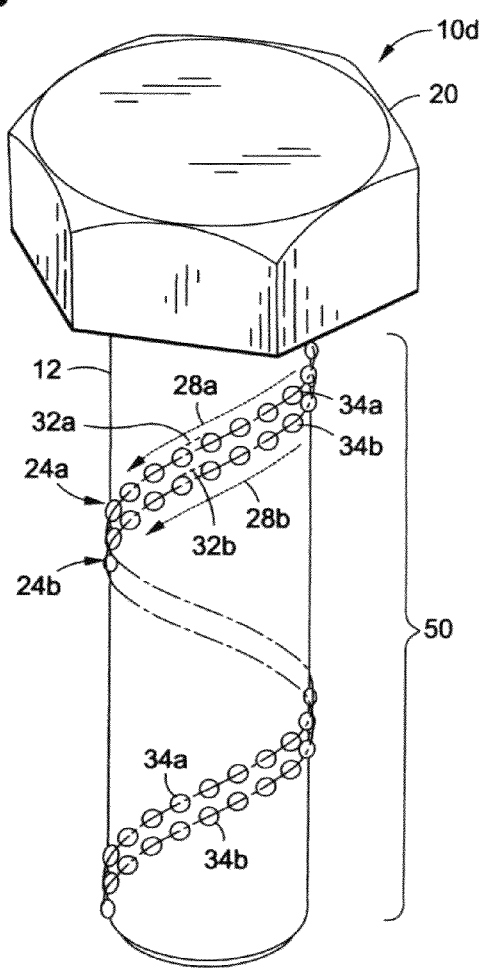
FIG. 4 is an illustration of a front perspective view of yet another embodiment of a fastener of the disclosure.

FIG. 4 is an illustration of a front perspective view of yet another embodiment of a fastener 10d of the disclosure. In this embodiment the fastener 10d comprises a double helical configuration 50. The fastener 10d comprises elongated, cylindrical shaft 12 or male portion and head 20 attached to the shaft 12. The fastener 10d further comprises first discontinuous longitudinal threadform 24a having a plurality of first spaced bumps 34a forming a first helical path 28a around the shaft 12, where the first helical path 28a has a first pitch 32a. The fastener 10d further comprises second discontinuous longitudinal threadform 24b comprising a plurality of second spaced bumps 34b forming a second helical path 28b around the shaft 12, where the second helical path 28b has a second pitch 32b. The first spaced bumps 34a and the second spaced bumps 34b may comprise a notch sensitive material, a thermoplastic or thermoset material, or another suitable material.

FIG. 6 is an illustration of a front perspective view of yet another embodiment of the fastener in the disclosure. In this embodiment the fastener 10e comprises a triple helical configuration 52. The fastener 10e comprises elongated, cylindrical shaft 12 or male portion and head 20 attached to the shaft 12. The fastener 10e further comprises first discontinuous longitudinal threadform 24a having a plurality of first spaced protrusions in the form of bumps 34a forming a first helical path 28a around the shaft 12, where the first helical path 28a has a first pitch 32a. The fastener 10e further comprises second discontinuous longitudinal threadform 24b comprising a plurality of second spaced protrusions in the form of bumps 34b forming a second helical path 28b around the shaft 12, where the second helical path 28b has a second pitch 32b. The fastener 10e further comprises a third discontinuous longitudinal threadform 24c comprising a plurality of third spaced protrusions in the form of bumps 34c forming a third helical path 28c around the shaft 12, where the third helical path 28c has a third pitch 32c. The first spaced bumps 34a, the second spaced bumps 34b, and the third spaced bumps 34c preferably comprise a notch sensitive material. FIG. 8 is a cross-sectional view of the fastener 10e of FIG. 6 taken along lines 8-8 of FIG. 6. As shown in FIG. 8, the cross-section of fastener 10e of FIG. 6 shows head 20, first spaced bumps 34a, second spaced bumps 34b, third spaced bumps 34c, and the bottom 42 of the shaft 12.

FIG. 7 is an illustration of a front perspective view of yet another embodiment of the fastener 10f of the disclosure. In this embodiment the fastener 10f comprises a triple helical configuration 54. The fastener 10f comprises elongated, cylindrical shaft 12 or male portion and head 20 attached to the shaft 12. The fastener 10f further comprises first discontinuous longitudinal threadform 24a having a plurality of first spaced protrusions in the form of bumps 34a forming a first helical path 28a around the shaft 12, where the first helical path 28a has a first pitch 32a. The fastener 10f further comprises second discontinuous longitudinal threadform 24b comprising a plurality of second spaced protrusions in the form of bumps 34b forming a second helical path 28b around the shaft 12, where the second helical path 28b has a second pitch 32b. The fastener 10f further comprises third discontinuous longitudinal threadform 24c comprising a plurality of third spaced protrusions in the form of bumps 34c forming a third helical path 28c around the shaft 12, where the third helical path 28c has a third pitch 32c. The first spaced bumps 34a, the second spaced bumps 34b, and the third spaced bumps 34c may comprise a may comprise a notch sensitive material, a thermoplastic or thermoset material, or another suitable material.

FIG. 9 is a front elevation view of yet another embodiment of the fastener 10g of the disclosure. In this embodiment the fastener 10g comprises a double helical configuration 56 having spaced protrusions 26 of varying sizes, shapes, and heights. The fastener 10g comprises elongated, cylindrical shaft 12 or male portion and head 20 attached to the shaft 12. The fastener 10g further comprises first discontinuous longitudinal threadform 24a having a plurality of first spaced protrusions 26*a* forming a first helical path 28*a* around the shaft 12, where the first helical path 28*a* has a first pitch 32*a*. The fastener 10*g* further comprises second discontinuous longitudinal threadform 24*b* comprising a plurality of second spaced protrusions 26*b* forming a second helical path 28*b* around the shaft 12, where the second helical path 28*b* has a second pitch 32*b*. The first spaced protrusions 26*a* and the second spaced protrusions 26*b* preferably comprise a notch sensitive material, a thermoplastic or thermoset material, or another suitable material. FIG. 9 shows the spaced protrusions having varying shapes, including the curved or round shape 36, the first elliptical shape 38, and the second elliptical shape 40. FIG. 16 is an illustration of a close-up side view of some of the first spaced protrusions 26*a* of the first helical path 28*a* with the first pitch 32*a* of FIG. 9 having varying shapes and showing the round or curved shape 36, the first elliptical shape 38, and the second elliptical shape 40.

Figure 10:
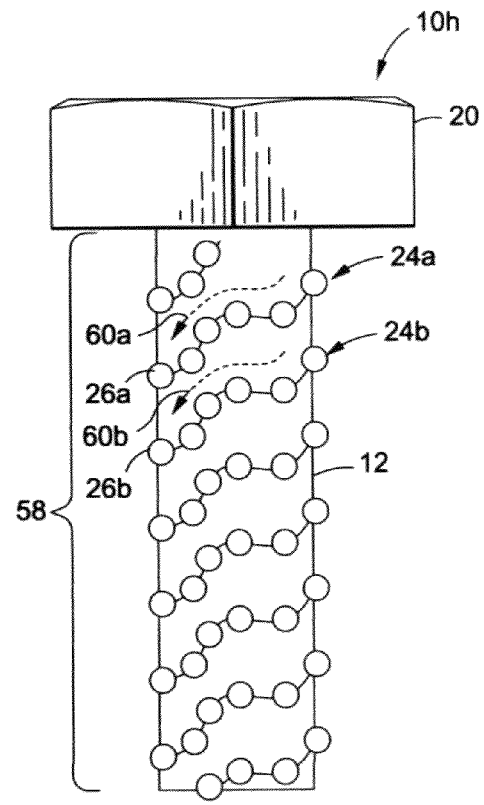
FIG. 10 is a front elevation view of yet another embodiment of the fastener of the disclosure.

FIG. 10 is a front elevation view of yet another embodiment of the fastener 10*h* of the disclosure. In this embodiment the fastener 10*h* comprises a sinusoidal bump configuration 58. The fastener 10*h* comprises elongated, cylindrical shaft 12 or male portion and head 20 attached to the shaft 12. The fastener 10*h* further comprises first discontinuous longitudinal threadform 24*a* having a plurality of first spaced protrusions 26*a* forming a first sinusoidal path 60*a* around the shaft 12. The fastener 10*h* further comprises second discontinuous longitudinal threadform 24*b* comprising a plurality of second spaced protrusions 26*b* forming a second sinusoidal path 60*b* around the shaft 12. The first spaced protrusions 26*a* and the second spaced protrusions 26*b* may comprise a notch sensitive material, a thermoplastic or thermoset material, or another suitable material. The first and second spaced protrusions 26*a*, 26*b* of the respective threadforms 24*a*, 24*b* may be formed in separate sinusoidal paths 60*a*, 60*b* around the shaft 12. The sinusoidally aligned first and second spaced protrusions 26*a*, 26*b* allow for contact between leading and trailing faces of a mating receptacle 64*a*, 64*b* (FIGS. 14A, 14B), as discussed below.

Figures 11, 12:
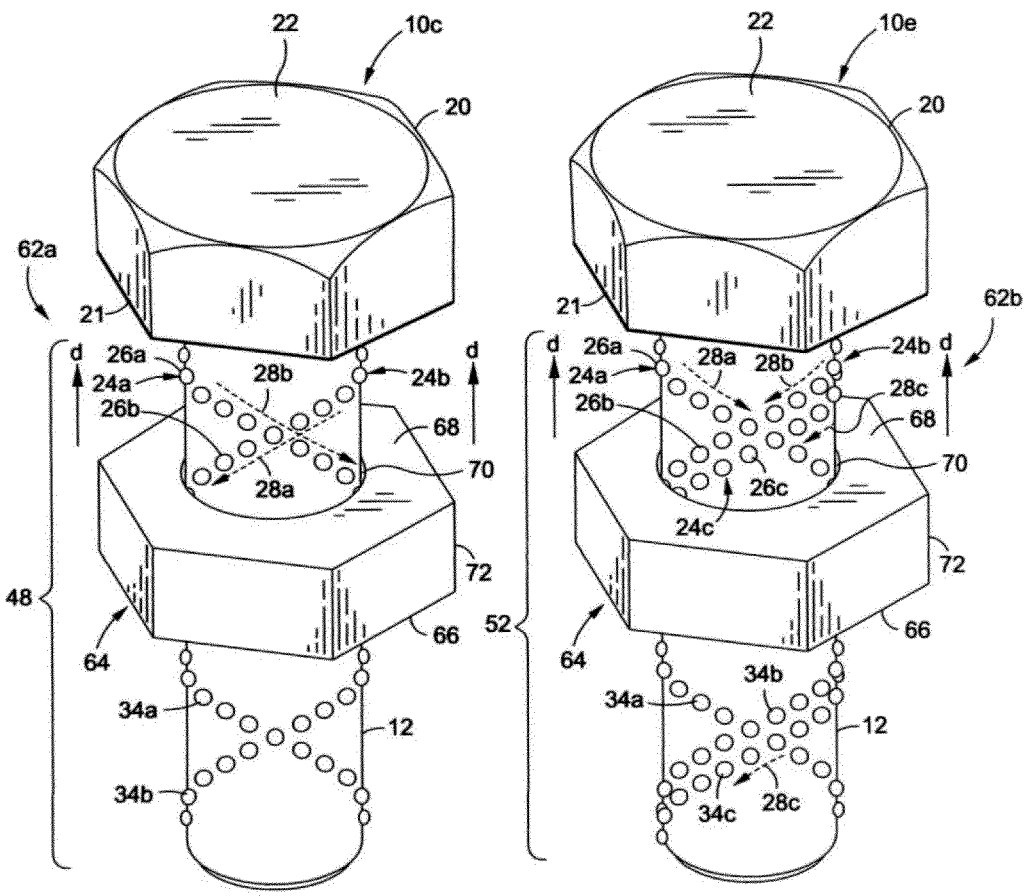
FIG. 11 is an illustration a perspective view of one of the embodiments of a fastener assembly of the disclosure.
FIG. 12 is an illustration of a perspective view of another embodiment of a fastener assembly of the disclosure.

FIG. 11 is an illustration of a perspective view of one of the embodiments of a fastener assembly 62*a* of the disclosure. The fastener assembly 62*a* comprises the fastener 10*c* having the elongated, cylindrical shaft 12 or male portion and the head 20 attached to the shaft 12. By example, the fastener 10*c* shown in FIG. 11 is the fastener 10*c* of FIG. 3 with the double helical configuration 48. FIG. 12 is an illustration of a perspective view of another embodiment of the fastener assembly 62*b* of the disclosure. By example, the fastener 10*e* shown in FIG. 12 is the fastener 10*e* of FIG. 6 with the triple helical configuration 52. However, any of the embodiments of the other fasteners 10*a*, 10*b*, 10*d*, 10*f*, 10*g*, 10*h*, discussed above, may be used in the fastener assembly 62*a* and 62*b*. As shown in FIG. 11, the fastener assembly 62*a* may further comprise two or more discontinuous longitudinal threadforms 24, such as threadforms 24*a*, 24*b*, where each threadform comprises a plurality of spaced protrusions 26, such as in the form of bumps 34, forming separate helical paths 28*a*, 28*b* around the shaft 12. Preferably, threadform 24*a* comprises a plurality of first spaced protrusions 26*a*, in the form of bumps 34*a*, forming helical path 28*a* around the shaft 12. Preferably, threadform 24*b* comprises a plurality of second spaced protrusions 26*b*, in the form of bumps 34*b*, forming helical path 28*b* around the shaft 12. As shown in FIG. 12, the fastener assembly 62*b* further comprises two or more discontinuous longitudinal threadforms 24*a*, 24*b*, 24*c* where each threadform respectively comprises a plurality of first, second, and third spaced protrusions 26*a*, 26*b*, 26*c*, such as bumps 34*a*, 34*b*, 34*c*, forming separate helical paths 28*a*, 28*b*, 28*c* around the shaft 12. As shown in both FIGS. 11-12, the fastener assembly 62*a* and 62*b* further comprises a corresponding mating receptacle 64 or female portion designed to compatibly mate with the shaft 12 or male portion of the fastener 10*c* or 10*e*. The mating receptacle 64 has a first end 66 and a second end 68. The mating receptacle 64 preferably has an opening 70 for insertion of the shaft 12 of the fastener 10*c* or 10*e*. The mating receptacle 64 shown in FIGS. 11-12 may have a hexagonal design 72. The mating receptacle 64 may also have other known suitable designs (not shown), such as square, wing, slotted, flange, jam, or another suitable thread configuration or design.

Figure 14A:
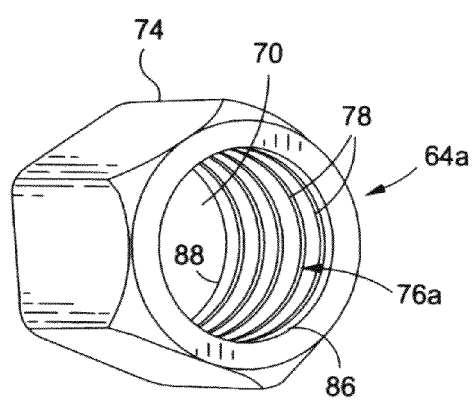
FIG. 14A is an illustration of a perspective view of one of the embodiments of a mating receptacle designed to mate with embodiments of the fastener of the disclosure.
Figure 14B:
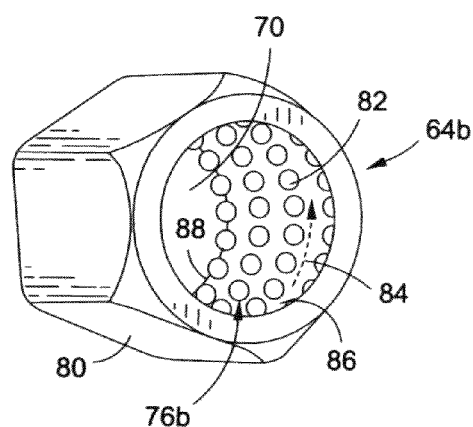
FIG. 14B is an illustration of a perspective view of another embodiment of a mating receptacle designed to mate with embodiments of the fastener of the disclosure.
Figure 18:
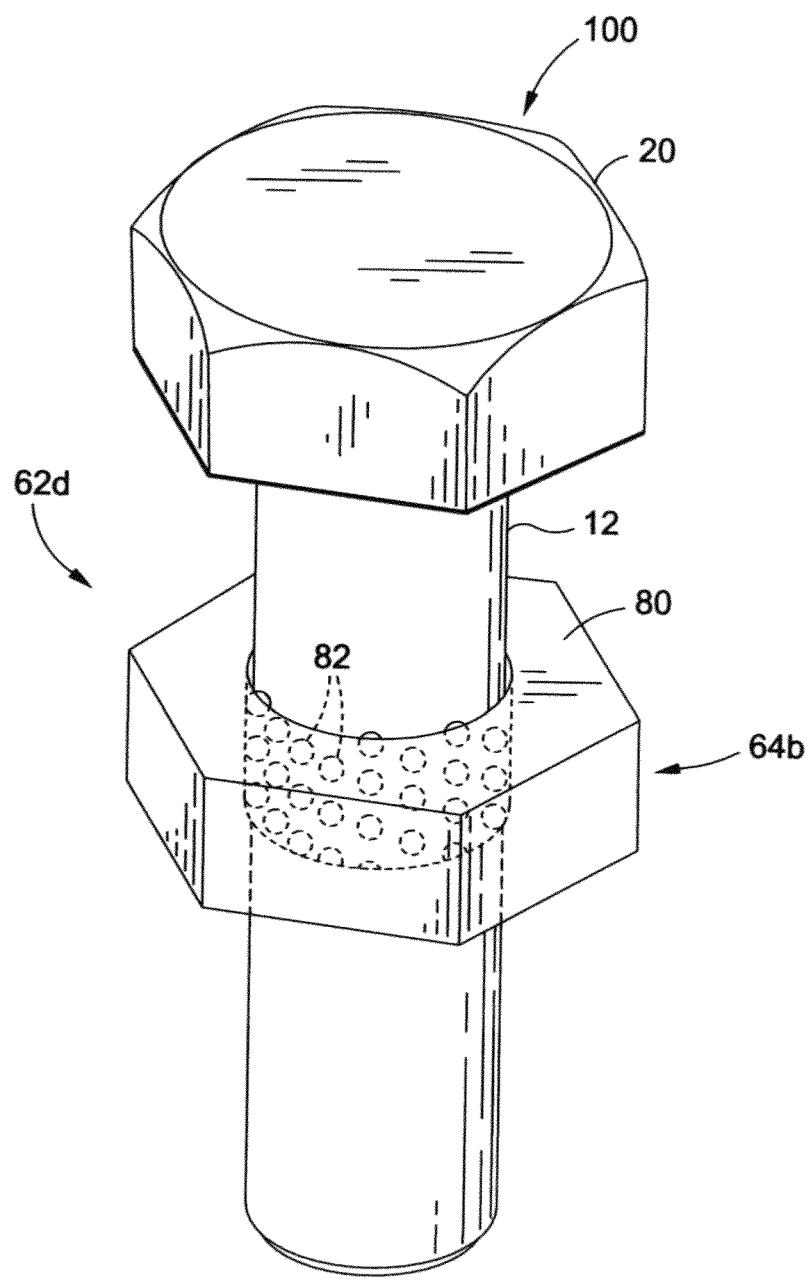
FIG. 18 is an illustration of a perspective view of yet another embodiment of a fastener assembly of the disclosure where the mating receptacle has spaced protrusions and the shaft of the fastener has no spaced protrusions or standard threads; and, FIG. 19 is an illustration of a perspective view of yet another embodiment of a fastener assembly of the disclosure where the mating receptacle has spaced protrusions and the shaft of the fastener has standard threads.
Figure 19:
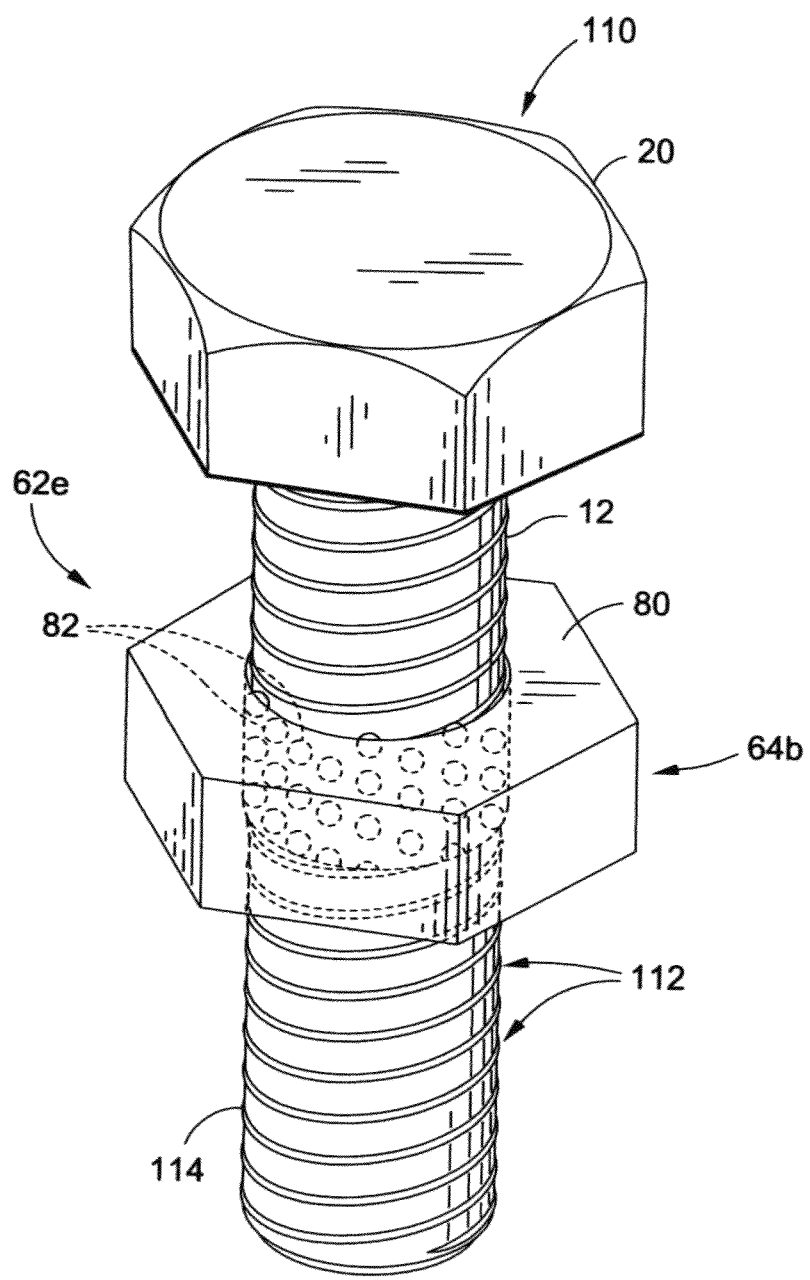

Exemplary mating receptacles 64*a*, 64*b* are shown in FIGS. 14A and 14B, respectively. FIG. 14A is an illustration of a perspective view of one of the embodiments of the mating receptacle 64*a* designed to mate with one or more embodiments of the fastener 10*a*-10*h* of the disclosure. The mating receptacle 64*a* in FIG. 14A comprises a threaded nut 74 have two or more internal theadforms 76*a* each having a plurality of internal threads 78. For example, the threaded nut 74 may comprise an ASME (American Society of Mechanical Engineers) or an SAE (Society of Automotive Engineers) standard threaded nut. FIG. 14B is an illustration of a perspective view of another embodiment of mating receptacle 64*b* designed to mate with embodiments of the fastener 10*a*-10*h* of the disclosure. The mating receptacle 64*b* in FIG. 14B comprises a nut 80 having two or more internal threadforms 76*b* where each internal threadform 76*b* comprises a plurality of corresponding internal spaced protrusions 82, such as in the form of bumps, forming separate helical paths 84. The mating receptacle 64*b* of FIG. 14B may be used with one or more embodiments of the fastener 10*a*-10*h* disclosed above. Alternatively, the mating receptacle 64*b* of FIG. 14B, in the form of nut 80 having the spaced protrusions 82, may be used with a corresponding fastener 100, as shown in FIG. 18, having a smooth shaft 12 with no spaced protrusions 26 or standard threads and having a head 20 attached to the shaft 12. FIG. 18 is an illustration of a perspective view of another fastener assembly 62*d* of the disclosure comprising the fastener 100 that may be used with the mating receptacle 64*b* in the form of nut 80 having the internal spaced protrusions 82, as shown in FIG. 14B. Alternatively, the mating receptacle 64*b* in the form of nut 80 having the internal spaced protrusions 82, as shown in FIG. 14B, may be used with a corresponding fastener 110, as shown in FIG. 19, having standard external threadforms 112 comprising standard threads 114. For example, the fastener 110 may comprise an ASME (American Society of Mechanical Engineers) or an SAE (Society of Automotive Engineers) standard threaded fastener or bolt. FIG. 19 is an illustration of a perspective view of fastener assembly 62*e* of the disclosure where the mating receptacle 64*b* has spaced protrusions 82 and the shaft 12 of the fastener 110 has standard external threadforms with threads 114.

The mating receptacle 64*b* may be made of the same or similar material as the fastener 10*a*-10*h* and/or the spaced protrusions 26, or the mating receptacle 64*b* may be made of a different material than the fastener 10*a*-10*h* and/or the spaced protrusions 26. In addition, the internal spaced protrusions 82 of the mating receptacle 64*b*, in the form of nut 80, may be made of the same or similar material as the remaining portion of the nut 80, or the internal spaced protrusions 82 may be made of a different material than the remaining portion of the nut 80. The internal spaced protrusions 82 may comprise a notch sensitive material or another suitable material. The notch sensitive material may comprise thermoplastic materials, thermoset materials, polyetherimide, polycarbonate, acrylates, epoxies, metals, or another suitable notch sensitive material. The internal spaced protrusions 82 comprising a material, such as a thermoplastic or a thermoset material, preferably allow for deformation of the internal spaced protrusions 82 to enhance the anti-vibrational nature of the threadforms.

In other embodiments, the mating receptacle 64a, 64b may comprise a washer/spacer (not shown), a workpiece (not shown), a potted insert (not shown), or another suitable mating receptacle. The mating receptacle 64a, 64b further comprises a leading surface 86 (see FIGS. 14A-14B) and a trailing surface 88 (see FIGS. 14A-14B).

To assemble the fastener assembly 62a-62c, the shaft 12 of the fastener 10c, 10e or 10i may be inserted into and through the opening 70 of the mating receptacle 64 with the second end 68 of the mating receptacle 64 facing opposite the first end 21 of the head 20. The mating receptacle 64 may be moved upward in direction (d) shown in FIGS. 11-13 toward the head 20 of the fastener 10c, 10e, or 10i until the second end 68 of the mating receptacle 64 is in secure contact with the first end 21 of the head, and the mating receptacle 64 is securely fastened to the shaft 12 of the fastener 10c, 10e, or 10i. The spaced protrusions 26 of the fastener 10c, 10e, or 10i may be altered in shape or position for positive contact with the leading surface 86 or the trailing surface 88 of either the mating internal threads 78 (see FIG. 14A) or the mating internal spaced protrusions 82 of (see FIG. 14B) the mating receptacle 64a or 64b. The spaced protrusions 26 may be of varying shape, size, and height along the length of the shaft 12 of the fastener 10c, 10e, or 10i to enhance or relax the torque required to pass either the internal threads 78 or the internal spaced protrusions 82 past the spaced protrusions 26 on the shaft 12. The spaced protrusions 26 may be helically oriented to match the internal threadforms 76a or the internal spaced protrusions 82 of the mating receptacle 64a or 64b. The threadforms 24 of the fastener 10c, 10e, or 10i may be compatible with the internal threadforms 76a with the internal threads 78 (see FIG. 14A), or with the internal spaced protrusions 82 (see FIG. 14B), of the mating receptacle 64a or 64b. When the shaft 12 is inserted into the mating receptacle 64a or 64b, a combination of the shaft 12 and the mating receptacle 64a or 64b provides two or more pitches or travels per rotation. The fastener 10c or 10d having a double helical configuration will preferably have two pitches. The fastener 10e or 10f having a triple helical configuration will preferably have three pitches. Each pitch may be identical or different.

If the mating receptacle 64b of FIG. 14B is used, such as nut 80 with the internal spaced protrusions 82, the fastener 10a-10h with corresponding spaced protrusions 26 (see FIGS. 1A, 1B, 3, 4, 6, 7, 9 and 10), the fastener 100 without any spaced protrusions 26 or standard threads (see FIG. 18), or the fastener 110 with standard threads 114 (FIG. 19) may be used. In one embodiment the fastener assembly 62a-62c comprises the elongated, cylindrical shaft 12 or male portion and the head 20 attached to the shaft 12, and two or more discontinuous longitudinal threadforms 24. The mating receptacle 64b may preferably be designed to compatibly mate with the shaft 12 of the fastener. In this embodiment of the fastener assembly 62a-62c, the mating receptacle 64b may have two or more internal threadforms 76b, where each threadform comprises a plurality of internal spaced protrusions 82 forming a separate helical path 84. The mating receptacle 64b with the spaced protrusions 82 may be designed to compatibly mate with a fastener 10a-10h having a shaft 12 with corresponding spaced protrusions 26 (see FIGS. 1A, 1B, 3, 4, 6, 7, 9 and 10), a fastener 100 having a shaft 12 with no spaced protrusions or threads (see FIG. 18), or a fastener 110 with standard threads (see FIG. 19). When the shaft 12 is inserted into the mating receptacle 64b in the form of nut 80 with the internal spaced protrusions 82, a combination of the shaft and the mating receptacle provides two or more pitches.

Figure 13:
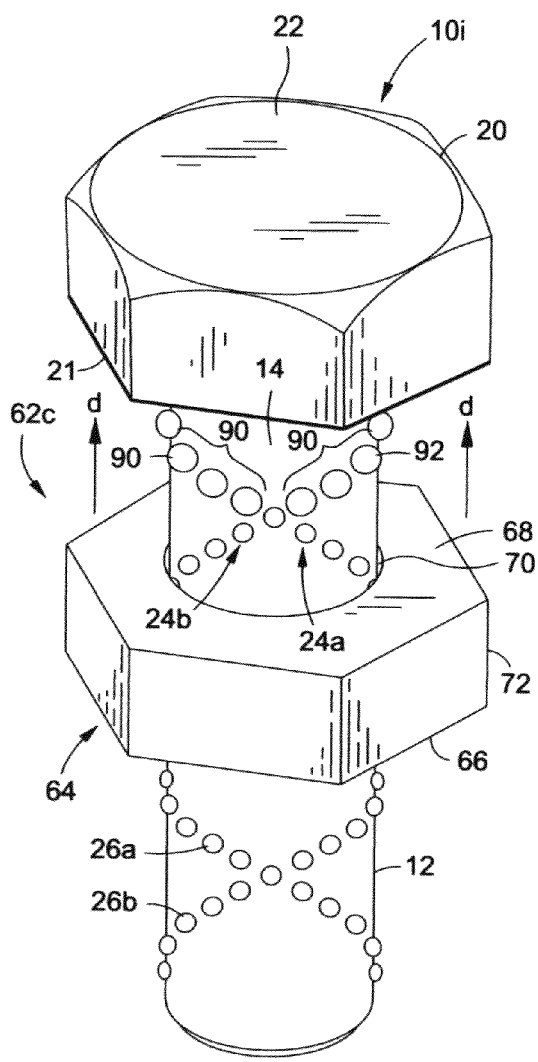
FIG. 13 is an illustration of a perspective view of yet another embodiment of a fastener assembly of the disclosure where the fastener has a locking mechanism.
Figure 17:
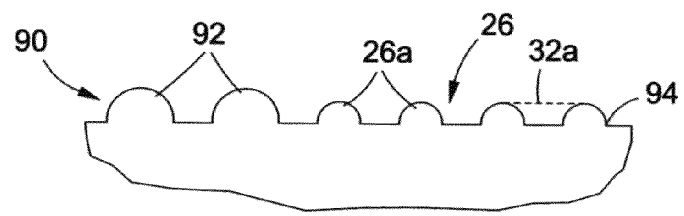
FIG. 17 is an illustration of a close-up side view of some spaced protrusions of FIG. 13.

FIG. 13 is an illustration of a perspective view of another embodiment of a fastener assembly 62c of the disclosure where the fastener 10i has a locking mechanism 90. In this embodiment, each threadform 24a, 24b has one or more locking spaced protrusions 92 at the first end 14 of the shaft 12 and near, adjacent to, or proximate to the first end 21 of the head 20. The locking spaced protrusions 92 may be of an increased or larger shape, size, and height than the spaced protrusions 26, such that when the shaft 12 is inserted into the mating receptacle 64, the locking spaced protrusions 92 and the mating receptacle 64 form the locking mechanism 90 that locks the mating receptacle 64 to the shaft 12 of the fastener 10i. The linearity, shape, and height of the spaced protrusions 26 may be varied or altered near the head 20 or at other desirable positions along the length of the shaft 12 of the fastener 10i to enhance or relax the torque required to pass the leading surface 86 (see FIGS. 14A-14B) and the trailing surface 88 of the mating receptacle 64 past the spaced protrusions 26 and lock with the locking spaced protrusions 92 to maximize the self-locking nature of the fastener 10i. FIG. 17 is an illustration of a close-up side view of the larger locking spaced protrusions 92 of the locking mechanism 90 and the smaller spaced protrusions 26 of FIG. 13.

The use of two or more separate and different helical paths 28 of the spaced protrusions 26 may enable the rapid installation of the mating receptacle 64a or 64b onto the shaft 12 of the fastener 10a-10i, while not allowing the backing off or removal of the mating receptacle 64a or 64b from the shaft 12 of the fastener 10a-10i. The helical path 28 of the spaced protrusions 26 may be either in a clockwise or counter-clockwise direction having pitches of the spaced protrusions 26 in either direction. This allows for the rapid installation and a slow removability of the mating receptacle 64a or 64b, as the mating receptacle 64a or 64b may have features allowing for non-removability in the direction of installation, e.g., a rough surface that scars the spaced protrusions 26 upon installation.

The spaced protrusions 26 are preferably curved with radii (not shown) at their base 94 (see FIGS. 15-17) where they are connected to the shaft 12 of the fastener 10a-10i, or in the case of internal spaced protrusions 82, where they are connected to the opening 70 of the mating receptacle 64b, such as nut 80. The absence of sharp radii (notches) at the protrusion root is to avoid any stress concentration at a root of each of the spaced protrusions 26 or internal spaced protrusions 82. The radii of the spaced protrusions 26 and internal spaced protrusions 82 may be structured so as to eliminate any sharp discontinuities of profile in the surface features of the threaded portion of the shaft or mating receptacle (nut). The spaced protrusions 26 allow for preferred loading of the shaft 12 from the threadforms 24 of the shaft 12 to other regions of the shaft 12. The spaced protrusions 26 may be strategically oriented and positioned to provide for localized loading (e.g., asymmetric loading) of the fastener 10a-10i against the leading surface 86 and the trailing surface 88 of the corresponding internal threadforms 76a, 76b of the mating receptacle 64a, 64b. The shape of the spaced protrusions 26 may also facilitate the rapid installation or removability of the mating receptacle 64a or 64b. The spaced protrusions 26 may be of a round or curved, elliptical, angular or other suitable shape to facilitate the rapid installation or removability of the mating receptacle 64a or 64b.

To make one or more embodiments of the fastener disclosed herein, the fastener may be molded from any material, such as a notch sensitive thermoplastic or thermoset material, or other suitable material. Suitable molding parameters and molding conditions to form the fastener and fastener assembly are preferred. The flexibility of the threadform with the spaced protrusions allows for various torques to be exhibited by the fastener during installation. Superior loading capability of the fastener can be damage tolerant while preventing threadform stripping and breakage of the fastener and fastener assembly from threadform failure. The fastener and fastener assembly of the disclosure may provide a reduction in fastener weight due to the lack of a continuous threadform and the material used to form such a continuous threadform. Substantial weight savings may be gained by the use of polymeric resins for the formation of the fastener.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A fastener comprising:
    a cylindrical shaft;
    a head attached to the shaft; and,
    two or more external, longitudinal threadforms, each threadform comprising a plurality of spaced protrusions forming a separate helical path around the shaft;
    wherein when the shaft is inserted into a corresponding mating receptacle, a combination of the shaft and the mating receptacle provides two or more pitches, and further wherein the plurality of spaced protrusions comprise a plurality of locking spaced protrusions and a plurality of non-locking spaced protrusions, wherein the plurality of locking spaced protrusions are proximate the head and are of a greater size compared to the non-locking spaced protrusions, such that when the shaft is inserted into the corresponding mating receptacle, the locking spaced protrusions and the corresponding mating receptacle form a locking mechanism that locks the corresponding mating receptacle to the shaft.

2. The fastener of claim 1 wherein the shaft, the head, and the spaced protrusions are comprised of a first material comprising a notch sensitive material.

3. The fastener of claim 1 wherein the spaced protrusions are comprised of a material selected from the group comprising thermoplastic material and thermoset material.

4. The fastener of claim 1 wherein the spaced protrusions are comprised of a material that allows for deformation of the spaced protrusions to enhance anti-vibration of the threadform.

5. The fastener of claim 1 wherein the corresponding mating receptacle is selected from the group comprising a threaded nut, a nut having corresponding spaced protrusions, a workpiece, a washer, and a potted insert.

6. The fastener of claim 1 wherein the corresponding mating receptacle comprises a nut having two or more internal threadforms, each internal threadform comprising a plurality of corresponding internal spaced protrusions forming separate helical paths.

7. The fastener of claim 1 wherein the corresponding mating receptacle is made of the same material as the spaced protrusions.

8. The fastener of claim 1 wherein the spaced protrusions are comprised of a first material comprising a notch sensitive material, and the shaft and the head are comprised of a second material different from the first material.

9. The fastener of claim 8 wherein the notch sensitive material comprises one or more of thermoplastic materials, thermoset materials, polyetherimide, polycarbonate, acrylates, epoxies, and metals.

10. The fastener of claim 1 wherein the non-locking spaced protrusions are of a uniform size.

11. The fastener of claim 1 wherein the spaced protrusions are formed in one or more shapes selected from the group consisting of angular, hemispherical, pyramidal, and curvilinear solid shapes including curved, elliptical, and toroid.

* * * * *